(No Model.)  W. F. PARISH.  3 Sheets—Sheet 1.
SAW GUIDE.

No. 342,876.  Patented June 1, 1886.

Witnesses
R. H. Sanford
Chas. L. James

Inventor
William F. Parish (No Model.) 3 Sheets—Sheet 2.

W. F. PARISH.
SAW GUIDE.

No. 342,876. Patented June 1, 1886.

Witnesses
R. H. Sanford
Chas. L. James

Inventor
William F. Parish (No Model.) 3 Sheets—Sheet 3.

W. F. PARISH.
SAW GUIDE.

No. 342,876. Patented June 1, 1886.

Witnesses
R. H. Sanford
Chas. L. James

Inventor
William F. Parish

UNITED STATES PATENT OFFICE.

WILLIAM F. PARISH, OF MINNEAPOLIS, MINNESOTA.

SAW-GUIDE.

SPECIFICATION forming part of Letters Patent No. 342,876, dated June 1, 1886.

Application filed January 26, 1886. Serial No. 189,800. (No model.)

*To all whom it may concern:*

Be it known that I, WILLIAM F. PARISH, of Minneapolis, in the county of Hennepin and State of Minnesota, have invented certain Improvements in Saw-Guides, of which the following is a specification.

My invention relates to improvements in the guides that are used with circular or other saws, and the objects I have in view are to provide independently-swinging guides for the opposite faces of the saw; also, to provide saw-guides that are reversible and adapted for use upon saws of either right-hand or left-hand cut. Heretofore such saws have been provided with swinging guides for the two sides of the saw, but both guides moved together, and neither could be turned away from the saw independently of the other. Such saws have also been provided with a swinging guide for the outer face of the saw and a guide for the opposite face, that could be adjusted in a right line across the frame, but could not be swung over away from the saw.

My invention consists, generally, in a saw-mill having swinging guides for the two faces of the saw, either capable of turning away from the saw independently of the other, or both turning together.

My invention also consists in the saw-guides that may be reversed and applied to saw-mills of either right-hand or left-hand cut.

My invention also consists in the combination and construction hereinafter described, and particularly pointed out in the claims.

Figure 1:
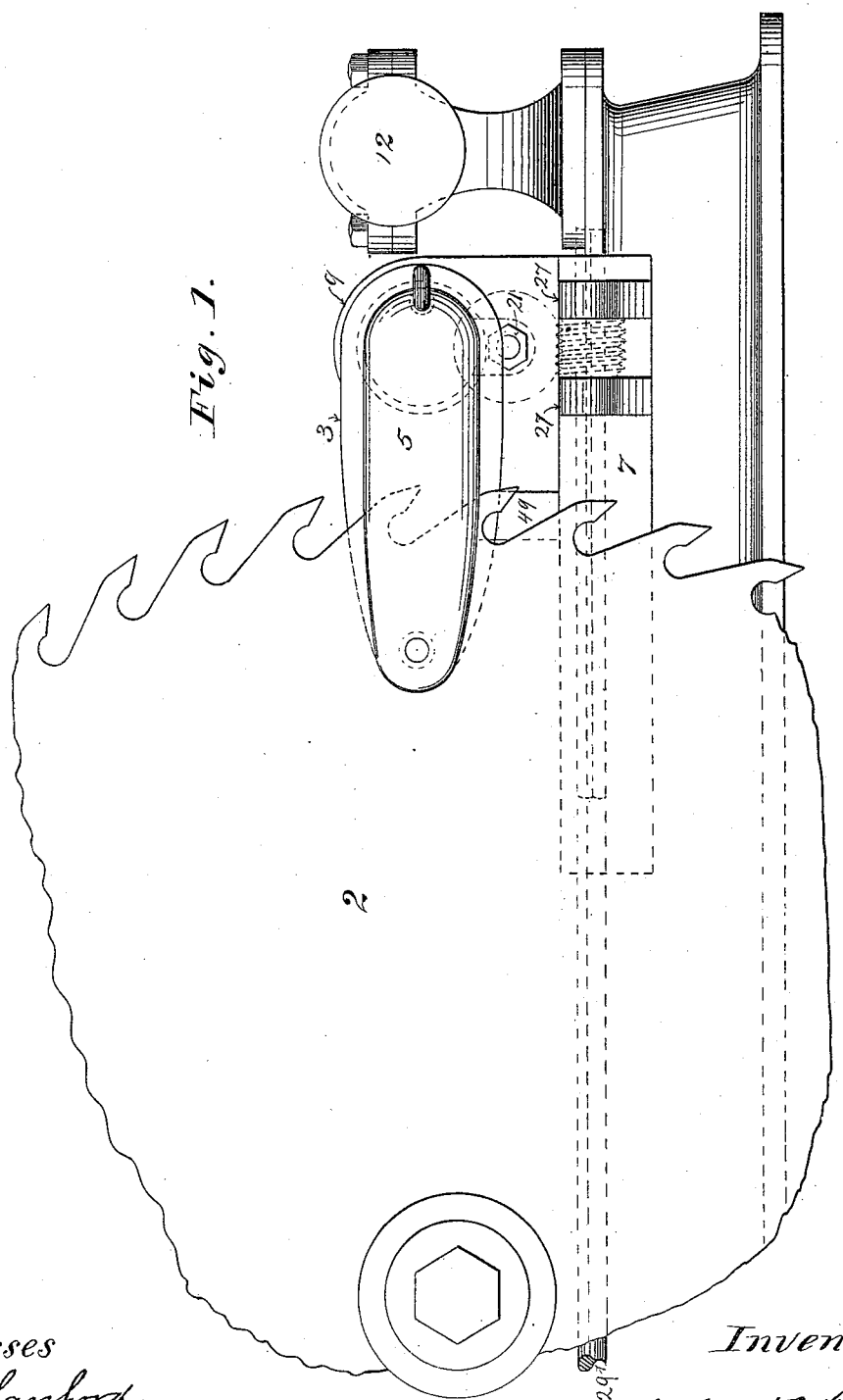
Figure 2:
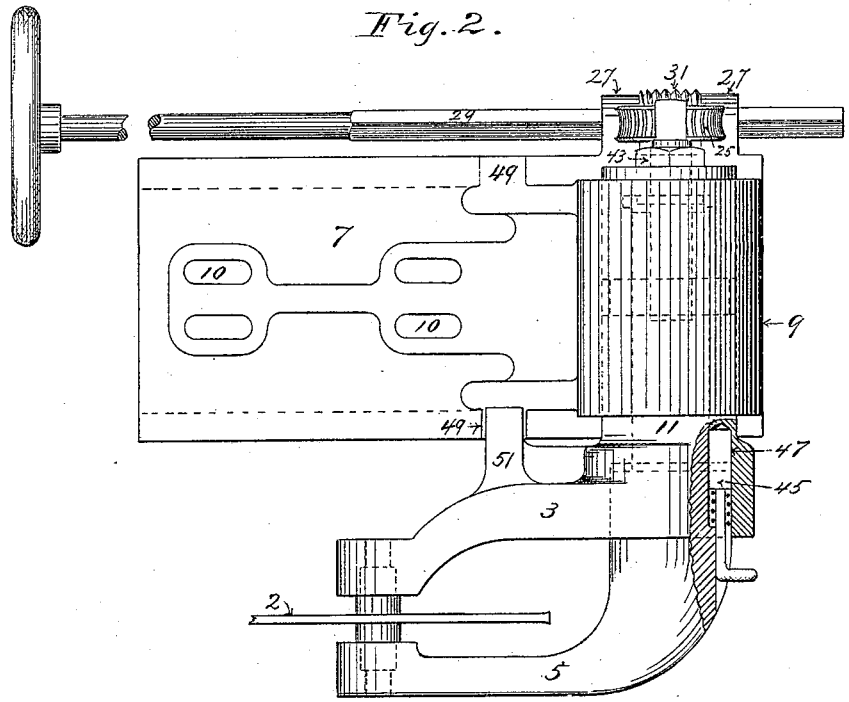
Figure 3:
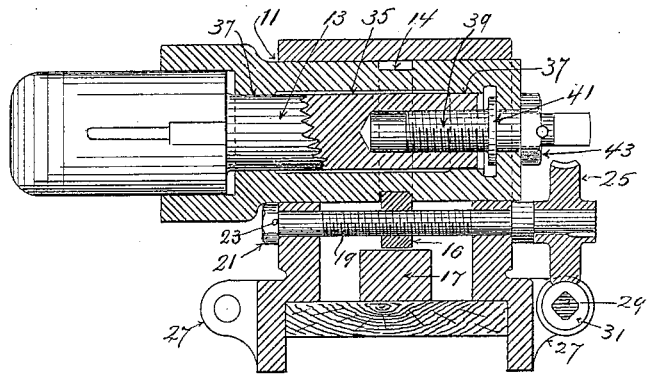
Figure 4:
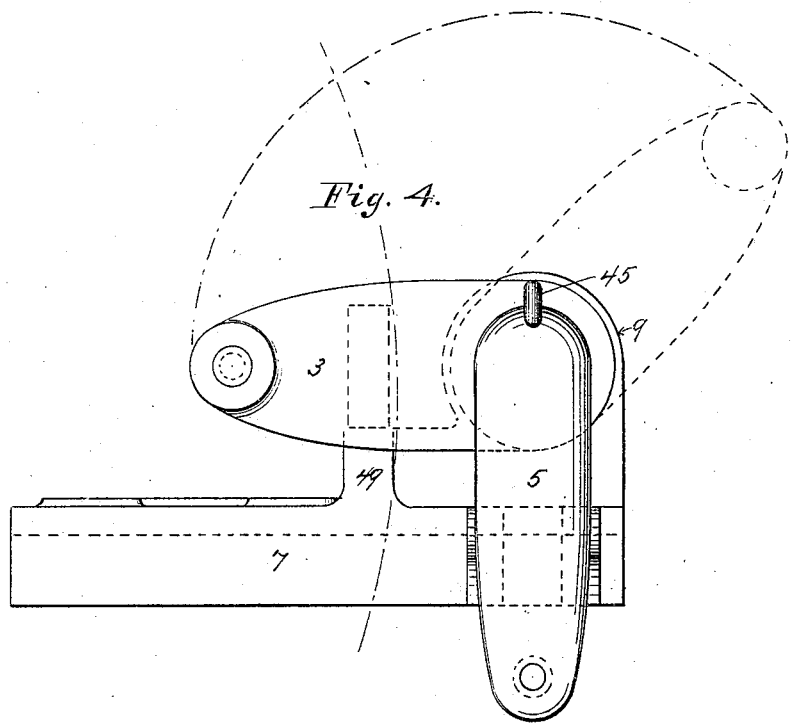
Figure 5:
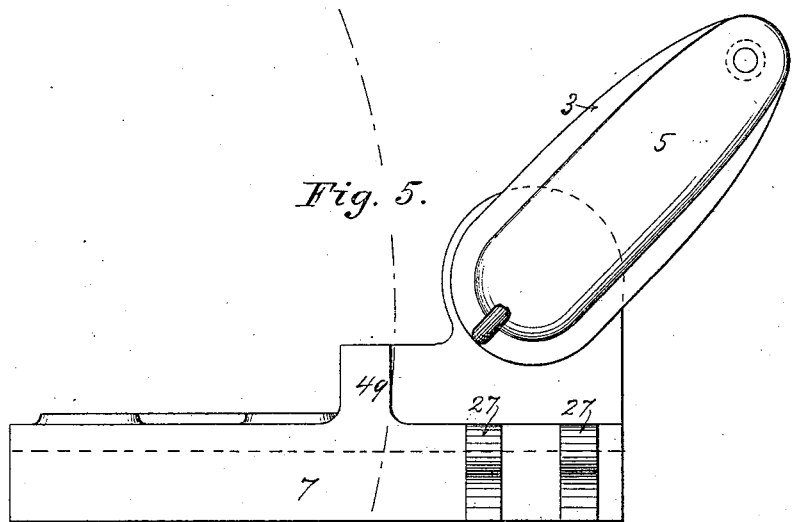

In the accompanying drawings, forming part of this specification, Figure 1 is a partial side elevation of a saw-mill having my guides applied thereto. Fig. 2 is a plan of the guides. Fig. 3 is a transverse vertical section through the arbors of the guides. Figs. 4 and 5 are details illustrating the manner of using the guides.

In the drawings, 2 represents an ordinary circular saw. It is mounted upon the bed or husk frame of the mill in any suitable manner.

3 and 5 represent the saw-guides. The guide 3 is located on the side of the saw next the frame, and the guide 5 on the opposite side. Each of these guides is of irregular L shape, having an arbor at right angles to its main part by which it is mounted so as to be free to swing back and forth from and to the saw. A bed-plate, 7, is secured to the main or husk frame. This plate has upon one end, extending crosswise thereof, a cylindrical housing, 9, within which the guides are mounted. The bed-plate has a number of slots, 10, therein, and suitable bolts extending through these slots hold it on the husk-frame and permit it to be adjusted lengthwise thereof to bring the guides into proper relation to the saw. This adjustment makes the device applicable to saws of different sizes. By forming this bed-plate with the housing upon one end, I am enabled to place the guides close to the rolls 12, and thus use a small husk-frame and economize in the construction thereof. The guide 3 is formed with a cylindrical arbor or journal, 11, that fits into the housing 9 and turns freely therein. About midway of its length the journal 11 has an annular groove, 14, formed in its surface. A chamber or space is formed in the lower part of the housing below the journal 11. In this space is located a nut, 16, whose upper end fits into the groove in the journal 11, as shown in Fig. 3. A block, 17, is arranged under the nut 16 and permits the nut to move longitudinally, but precludes its turning on its axis. A threaded rod, 19, extends beneath the journal 11, and upon this rod the nut 16 is mounted. This rod is journaled in the portions of the bed-plate that support the housing. Upon one end the rod has a nut, 21, that is secured by a pin, 23, and upon the other a worm-wheel, 25. Projecting from each side of the bed-plate 7 are two lugs, 27, and in openings in these lugs a rod, 29, is supported. The part of the rod that extends through the lugs is preferably formed of square iron with the corners removed, giving it an irregular octagonal shape in cross-section. A worm, 31, having a correspondingly-shaped opening, is mounted on this rod between the projections 27 and in engagement with the worm-wheel 25. The worm 31 turns with the rod, but is free to move on the rod as the bed-plate is adjusted to or from the saw-arbor. The rod extends preferably to the opposite end of the frame of the mill, and is in convenient position to be operated by the sawyer. By turning the rod 29 the nut 16 is moved on the screw 19 and the arbor 11 is adjusted in the housing, thereby moving the guides 3 5 in a direction at right angles to the plane of the saw. The guide 5 is formed with a cylindrical arbor or journal, 13, which is mounted in an opening, 35, in the arbor of the guide 3. The opening 35 extends nearly through the journal 11, and has, preferably, the bearing rings or surfaces 37, within which the journal 13 revolves. The inner end of the journal 13 has a screw-threaded socket formed in it, into which is fitted an adjusting-screw, 39. This screw turns freely in an opening through the end of the journal 11, and is prevented from moving longitudinally therein by a collar, 41, upon the inner side, and a nut, 43, that is pinned to it outside the end of the journal. By turning the screw 39 the journal 13 is moved longitudinally in the journal 11, and the distance between the bearing blocks or faces of the guides is regulated. When the journal 13 is revolved, the screw 39 turns therewith, and the adjustment of the guides is not affected thereby. These guides, as thus constructed, are free to turn independently of each other, and I provide suitable means by which they may be connected, so as to turn together or be disconnected, so as to turn independently. A spring pin or latch, 45, is seated in the guide 5, and is adapted to enter a socket, 47, in the guide 3 or its journal. Other suitable means, as a key or pin passing through the two, may be used to connect the guides. A lug or stop, 49, is formed on each side of the bed-plate, and a projection, 51, is formed on the guide 3. This projection strikes on the stop 49, and holds the guide, when in contact with the saw, in a horizontal position. The guide 5 is free to make a complete revolution on its axis, and the guide 3 is free to turn in one direction until it encounters the stop 49, and in the opposite direction until it strikes the roller 12 or its frame.

There are many advantages that arise from the use of these independently-journaled guides. For instance, either guide may be adjusted independently, and while being so adjusted it can be swung back and forth clear of the saw and across its face. This can be done repeatedly until exactly the desired adjustment is obtained. After one guide is adjusted it may be turned away from the saw without altering the adjustment, and the other guide can then be adjusted in the same way. Both guides may be together turned away from the saw, or by unlatching the outer guide it will drop to the vertical position indicated in Fig. 4. It sometimes happens that after the saw has entered the cut, when the log is over the outer guide, that a splinter gets from the log between the outer guide and the saw. This can be easily removed by pulling the latch and allowing the guide to swing down away from the saw to the position shown in Fig. 4.

Each guide is provided with suitable wearing-blocks, 57, which come in contact with the sides of the saw.

It will be seen that the two sides of the bed-plate are in correspondence, and that the housing will receive the journals from either end. The worm and its operating means may be mounted on either side of the bed-plate. The guides may therefore be arranged to project from either end of the housing, and the device may be used upon a machine of either right-hand or left-hand cut. By this means I am enabled to make a reversible guide without increasing the length of the bed-plate.

The means for supporting and adjusting the guides may be varied without departing from my invention.

What I claim is—

1. In a sawing-machine, swinging guides for the opposite sides of the saw mounted upon independent journals at right angles to the plane of the saw, substantially as described.

2. In a sawing-machine, swinging guides for the opposite sides of the saw mounted upon independent journals at right angles to the plane of the saw, and means for connecting and disconnecting said guides, substantially as described.

3. The combination, with a circular saw, of guides 3 and 5, for the opposite sides of the saw, mounted upon independent journals and swinging in planes parallel to the plane of the saw, and means for connecting and disconnecting said guides, whereby both may be turned together or either may be turned independently of the other, as set forth.

4. The combination, with the housing, of the guide 3, having a hollow arbor, 11, or journal mounted and turning freely in said housing, and the guide 5, having its arbor mounted and turning freely in the arbor of the guide 3, as set forth.

5. The combination, with the bed-plate 7, and the cylindrical housing arranged transversely thereon, of the reversible saw-guides fitting into said housing and adapted to be inserted from either end, as set forth.

6. The combination, with the saw-guide 3, having the hollow arbor 11, of the guide 5, having an arbor, 13, mounted in the arbor 11, and means for longitudinally adjusting the arbor 13 in the arbor 11, as set forth.

7. The combination, with the housing 9, of the guides having the cylindrical arbor 11, provided with the annular groove, the nut 16, engaging said groove, and means for moving said nut, substantially as described.

8. The combination, with the adjustable bed-plate 7, having the housing and the projections 27, of the saw-guides mounted in said housings, the adjusting-screw having the worm-wheel on its end, the worm, and the rod by which said worm is turned and upon which it is free to slide as said bed-plate is adjusted, substantially as described.

In testimony whereof I have hereunto set my hand this 22d day of January, 1886.

WILLIAM F. PARISH.

In presence of—
A. C. PAUL,
R. H. SANFORD.